C. L. KAUFMAN.
ANIMAL TRAP.
APPLICATION FILED APR. 15, 1911.
1,046,799.
Patented Dec. 10, 1912.
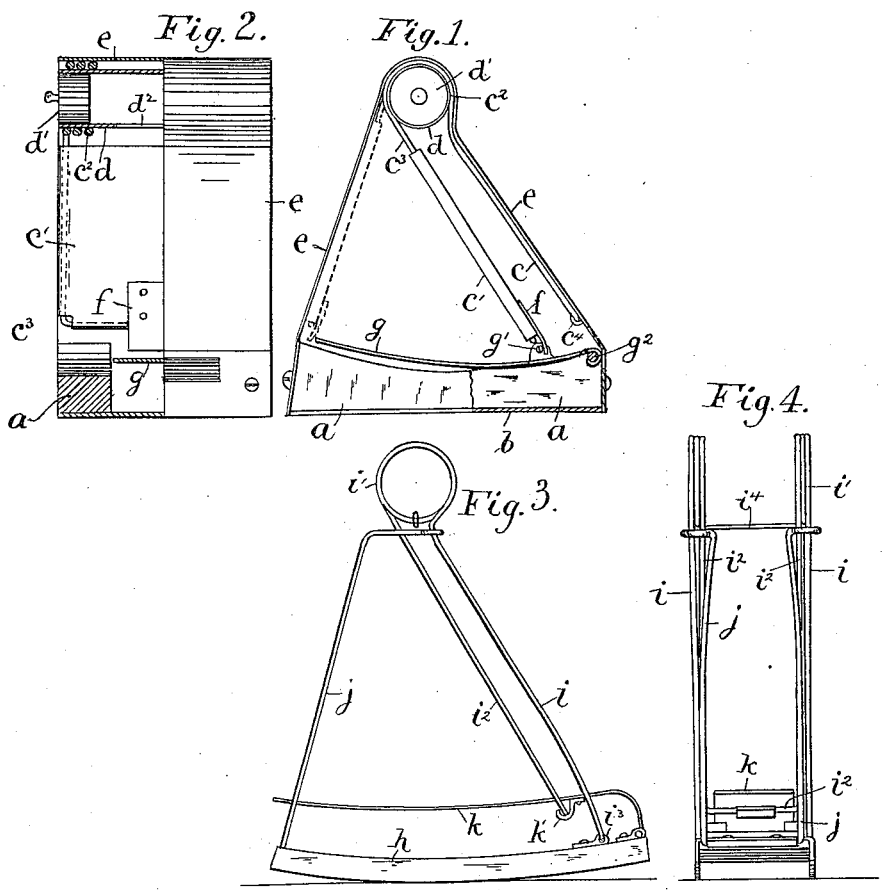

UNITED STATES PATENT OFFICE.

CHARLES L. KAUFMAN, OF WESTBROOK, MAINE.

ANIMAL-TRAP.

1,046,799.

Specification of Letters Patent.

Patented Dec. 10, 1912.

Application filed April 15, 1911. Serial No. 621,242.

*To all whom it may concern:*

Be it known that I, CHARLES L. KAUFMAN, of Westbrook, in the county of Cumberland and State of Maine, have invented certain new and useful Improvements in Animal-Traps, of which the following is a specification.

My invention relates to animal traps, and the object of the invention is to produce an animal trap which will seize the animal in such a way as to crush its body and kill it instantly, thus avoiding any prolonged suffering.

My invention is best understood by reference to the accompanying drawing, in which are shown two different forms of my invention, although I desire it to be understood that other forms may be constructed without departing from the spirit of my invention.

In the drawing, Figure 1, is a side elevation of one form of my invention with a portion in section. Fig. 2, is a rear view showing half as a central vertical section and half in elevation. Fig. 3, is a side elevation of an alternate form of my invention, and, Fig. 4, is an end view of the same.

Referring to Figs. 1 and 2, a base is formed of two side pieces $a$ and united by a bottom piece $b$. The upper surfaces of the side pieces are curved to conform substantially with the path of the lower end of the spring jaw as hereinafter set forth.

On one end of the base is secured an upright, and on the other end is an upwardly extending abutment. As here shown, the upright is formed by one portion of a housing $e$ which is secured to one end of the base, extends over the top of the trap and is secured by the opposite end to the other end of the base. The abutment is formed by the part of the housing which lies opposite to the upright portion. A spring jaw secured by its upper end adjacent to the upper end of the upright and the abutment and is designed to pinion the animal against the abutment. As here shown, this jaw is formed of spring wire which is secured at $c^4$ on the inside of the housing $c$, extends upwardly, forming a cylindrical spring coil $c^2$ at the top, thence extends downwardly to form the spring jaw $c^3$, having a vertical wire member on each side, and a connecting member at the bottom. As shown, the spring jaw is covered with a covering plate $c'$ to form a larger bearing surface. A horizontally disposed trigger $g$ adjacent to the lower end of the spring jaw engages with the jaw. As here shown, the trigger $g$ is adjacent to the base, and occupies when down the space between the side pieces $a$. It is pivoted at $g^2$ at one end of the base and has a catch $g'$ on its upper side which engages an extension $f$ on the lower end of the spring jaw. When the trigger $g$ is raised, the extension $f$ engages the catch $g$, and when the trigger is depressed by the weight of an animal or otherwise the spring jaw is forced against the abutment pinioning the animal and crushing it against the abutment. This trap may be used with or without bait, but if bait is to be used, I provided a cylindrical holder $d$ which fits within the coil $c^2$ and extends across the top of the trap. The holder has a slot $d^2$ in its under side, and a stopper $d'$ at one end. The smell of the bait coming through the slot $d^2$ will attract the attention of the animal and cause it to step on the trigger.

In Figs. 3 and 4, I have shown a modified form of my trap constructed largely of wire. The base $h$ is made of a piece of sheet metal with a stiffening flange turned down on each side. The upright member is formed of a double wire $i$, secured to one end of the base at $i^3$, one upright wire on each side of the base. Each wire extends upward forming a coil spring $i'$ at the top, and thence downwardly, forming the spring jaw $i^2$, the two side wires of the jaw uniting at the bottom. Thus the two uprights, the springs, and the jaw are formed of a single piece of spring wire. The abutment against which the spring jaw acts, is formed of a single piece of wire, doubled to form two upright members, one on each side, these extending up are secured to the wire $i$ at a point near the top. A cross piece $i^4$ unites the two coils and strengthens the upper portion of the trap. The trigger $k$ as here shown, is formed of a strip of sheet metal pivoted at one end of the base, and extending through the lower portion of the jaw between the side wires thereof. It has a catch $k'$ on the under side adapted to catch the lower end of the jaw. When the trigger is depressed, the jaw is released and swings over against the abutment. It will be seen that both the jaw and the abutment have two parallel wires, so that the animal is pinioned firmly between the two pairs of wires and is instantly killed.

This trap having a horizontally disposed trigger or platform and an inclosed space above the platform can be set in a run way on the surface where animals travel, or it may be set in a subterranean passage by digging down from the top and lowering the trap into the passage. It is an efficient device for trapping gophers, rats, muskrats, and other small animals and may be made for large animals as well.

It will be seen that in the form of trap shown in Figs. 1 and 2 the lower end of the spring jaw is guided in its movement by the side pieces $a$, and in the form shown in Figs. 3 and 4 the jaw is guided by lateral edges of the trigger.

I claim:

An animal trap comprising a base, a wire upright at one end of the base bent at the top to form a spring coil, a spring jaw connected with said coil, a sheet metal housing secured to one end of the base extending over the top, a portion of said housing constituting an abutment to coöperate with said spring jaw, a trigger adapted to engage said spring jaw, and a bait holding cylinder extending through said coil.

In testimony whereof I have affixed my signature, in presence of two witnesses.

CHARLES L. KAUFMAN.

Witnesses:
S. W. BATES,
C. B. CREIGHTON.

---

Copies of this patent may be obtained for five cents each, by addressing the "Commissioner of Patents, Washington, D. C."